(12) United States Patent
Sun et al.

(10) Patent No.: US 11,671,343 B2
(45) Date of Patent: Jun. 6, 2023

(54) DYNAMIC NETWORK TRAFFIC SNIFFER

(71) Applicant: Helios Data Inc., Mountain View, CA (US)

(72) Inventors: Yi Sun, San Jose, CA (US); Fei Zou, Menlo Park, CA (US)

(73) Assignee: Helios Data Inc., Mountain View, CA (US)

( * ) Notice: Subject to any disclaimer, the term of this patent is extended or adjusted under 35 U.S.C. 154(b) by 4 days.

(21) Appl. No.: 17/185,454

(22) Filed: Feb. 25, 2021

(65) Prior Publication Data

US 2021/0273872 A1 Sep. 2, 2021

Related U.S. Application Data

(60) Provisional application No. 62/982,942, filed on Feb. 28, 2020.

(51) Int. Cl.
| | | |
|---|---|---|
| *H04L 12/26* | (2006.01) | |
| *H04L 43/12* | (2022.01) | |
| *H04L 43/02* | (2022.01) | |
| *H04L 43/045* | (2022.01) | |
| *H04L 43/062* | (2022.01) | |

(52) U.S. Cl.
CPC .............. *H04L 43/12* (2013.01); *H04L 43/02* (2013.01); *H04L 43/045* (2013.01); *H04L 43/062* (2013.01)

(58) Field of Classification Search
None
See application file for complete search history.

(56) References Cited

U.S. PATENT DOCUMENTS

| 6,738,813 | B1 | 5/2004 | Reichman | |
|---|---|---|---|---|
| 10,084,680 | B2 | 9/2018 | Dolson et al. | |
| 2003/0145225 | A1* | 7/2003 | Bruton, III | .......... H04L 63/1408 726/23 |
| 2006/0002331 | A1* | 1/2006 | Bhagwat | ............... H04L 69/163 370/328 |
| 2007/0112586 | A1 | 5/2007 | Dettinger et al. | |

(Continued)

FOREIGN PATENT DOCUMENTS

| EP | 2317696 A1 | 5/2011 |
|---|---|---|
| WO | 2011/062530 A1 | 5/2011 |

OTHER PUBLICATIONS

International Search Report and Written Opinion in Appl. No. PCT/US2021/019622 dated Jun. 14, 2021, 12 pages.

*Primary Examiner* — Natisha D Cox
(74) *Attorney, Agent, or Firm* — Kowert, Hood, Munyon, Rankin & Goetzel, P.C.

(57) ABSTRACT

Techniques are disclosed relating to data discovery. A control program that is executing on a computer system may receiving a request to locate instances of data on a computer network having a plurality of computer systems that are managed by an orchestration program. The control program may perform multiple, limited-time-period deployments of a sniffer program to different portions of the computer network in order to sample network traffic from the different portions to determine whether instances of the data appear in the network traffic. The control program may receive, from the sniffer program, information that identifies one or more of the different portions of the computer network whose network traffic included instances of the data.

19 Claims, 7 Drawing Sheets

(56) References Cited

U.S. PATENT DOCUMENTS

| | | | |
|---|---|---|---|
| 2007/0288500 A1* | 12/2007 | Sarnowicz | G06F 11/3495 |
| 2010/0281389 A1* | 11/2010 | Hutchinson | H04L 67/14 |
| | | | 715/736 |
| 2017/0250908 A1* | 8/2017 | Nainar | H04L 45/04 |
| 2018/0025011 A1 | 1/2018 | Aksionkin et al. | |
| 2020/0019410 A1* | 1/2020 | Dima | G06F 9/54 |
| 2020/0067799 A1 | 2/2020 | Lenglet et al. | |

\* cited by examiner

DYNAMIC NETWORK TRAFFIC SNIFFER

RELATED APPLICATIONS

The present application claims priority to U.S. Provisional Appl. No. 62/982,942 filed Feb. 28, 2020; this application is incorporated by reference herein in its entirety.

BACKGROUND

Technical Field

This disclosure relates generally to a data management system and, more specifically, to a probe capable of discovering the data topology of a computer network.

Description of the Related Art

Many companies gather and store data about their users, customers or employees. This data can include any manner of information, such as individual profile information, financial information, medical information, and activity information (e.g., location history). The amount of data that is gathered and stored can often be extremely large and it continues to grow quickly. The collection and management of data, however, can be problematic for companies. Companies are normally unaware of all the different types of personal data that they have on their system and even where that data is stored. This usually occurs because unstructured data (e.g., documents, photos, videos, etc.) accounts for most of the available data and such data is often scattered around layers of a network (e.g., a cloud network, a data center network, etc.) with poor structuring and visibility. As a result, companies are unable to identify and locate all the data that they have stored for individual customers/users across a myriad of computers and networks.

DETAILED DESCRIPTION

Figure 1:
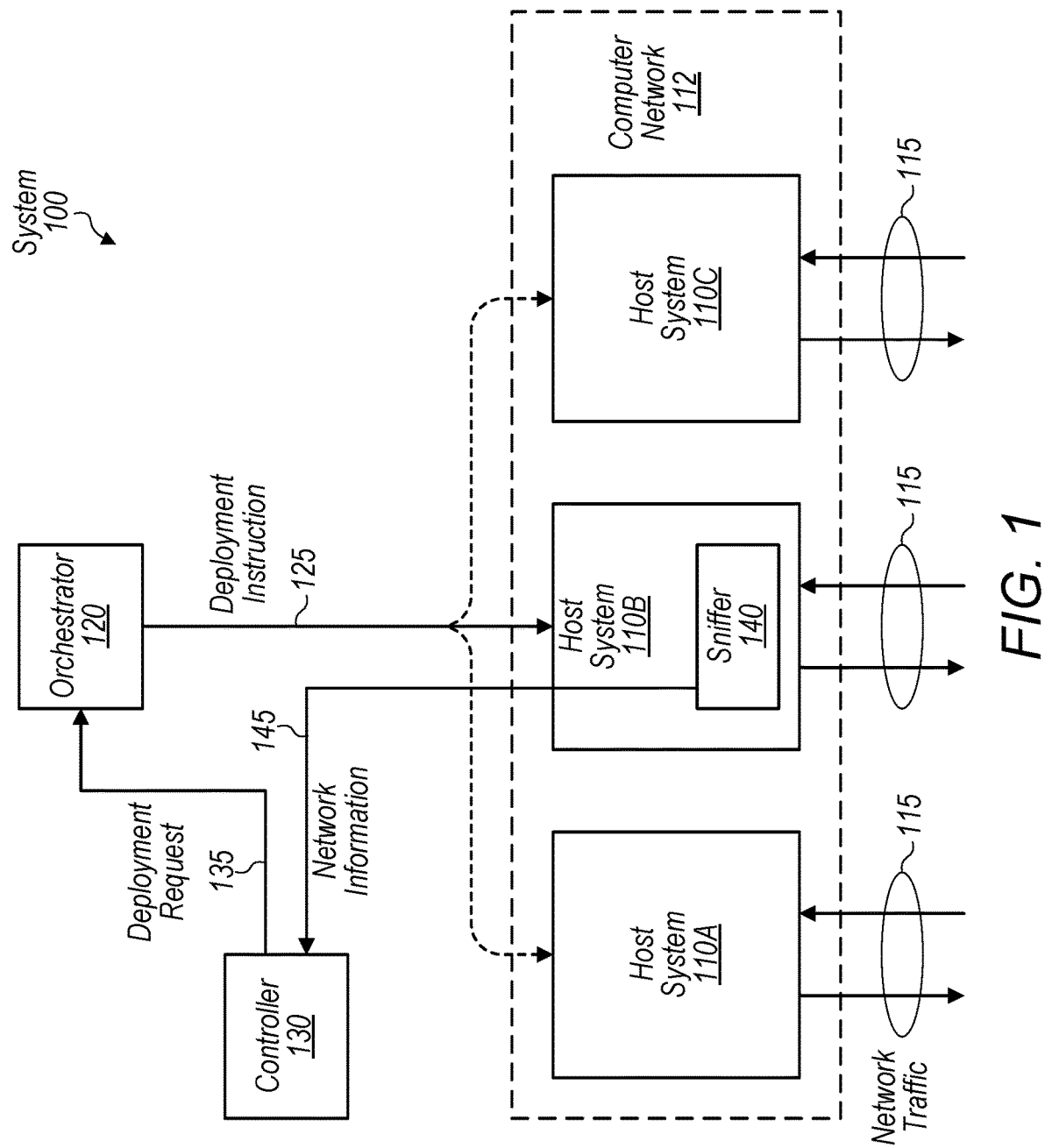
FIG. 1 is a block diagram illustrating example elements of a system that includes a computer network of host systems and a sniffer/probe, according to some embodiments.

Without proper knowledge about how data is stored within a company's computer network, a company can neither protect that data from being stolen nor ensure that data privacy provisions are enforced on that data. As an example, without the proper knowledge, a company cannot know where to deploy a security system within their computer network to ensure that data is not stolen or misused. It may thus be desirable to identify portions of a computer network that store data that is deemed significant or is of interest to an entity (e.g., a company) so that the data can be properly managed. As used herein, the phrase "data of interest" broadly refers data that has been designated by an entity as having a certain level of importance to that entity. Data that is of interest to a first entity may not be of interest to a second entity—that is, the data itself does not have an inherent property that makes it important, rather it is only the opinion of an entity that causes that data to be important to that particular entity.

One approach for identifying portions of a computer network that store data that may be of interest to an entity is to monitor network traffic for such data. In various cases, a software program called a traffic sniffer can be deployed that monitors network traffic to help an entity to understand the topology of their network (e.g., what applications and services are running on the network). In one approach for deploying a traffic sniffer, the traffic sniffer is connected to the spam port of an aggregation switch, which connects a number of top-of-rack switches (including all the systems of those switches) to a central core switch of the network. In a virtual environment, however, traffic that flows between systems within a data center may not hit on the aggregation switch when that network traffic is forwarded directly by a virtual switch of a system within the network. As a result, the traffic sniffer misses traffic that may be helpful in understanding the topology of the network. In yet another approach, multiple traffic sniffers are deployed where at least one traffic sniffer is running on each TOR or even for each hypervisor of a virtualized computer network. Running one traffic sniffer per hypervisor or per TOR, however, introduces huge management and performance overhead, especially when trying to correlate all the traffics collected from different sniffers. Moreover, as the computer network grows, this approach becomes difficult to scale as more and more traffic sniffers have to be deployed, each of which is consuming resources of the computer network. Due to the very high cost that is required in that approach to analysis the traffic for an entire network, it can be difficult to find an appropriate insertion point for a program that can provide visibility of the enter network. Thus, it may be desirable to deploy traffic sniffers in a manner that allows for low overhead, low resource cost, and high scalability while also providing full coverage of the network so that the topology of the network can be understood and interested data can be discovered.

The present disclosure describes various techniques for identifying portions of a computer network that include data that is deemed of interest by an entity or may be of interest to that entity and for presenting the topology of the computer network and discovering the interested data from the network traffic, including portions of interest, to enable the entity to make an informed decision on where to deploy data collectors (discussed in greater detail below) or other systems within the computer network. In various embodiments that are described below, a control program performs multiple, limited-time-period deployments of a sniffer program to different portions of a computer network. Throughout this disclosure, the sniffer program can be referred to as a "dynamic" network traffic sniffer as it can be deployed to monitor the network traffic of a first portion of a computer network and then redeployed to monitor the network traffic of a second, different portion of the computer network. A dynamic network traffic sniffer stands in contrast to a "static" network traffic sniffer that is not redeployed to monitor the network traffic of different portions of a computer network. In a non-cloud-based environment, a sniffer program may be deployed to run on a virtual machine executing on a host system of the computer network. The sniffer program being described as deployed for a limited-time-period refers to the notion that the sniffer program does not remain on a host system for an unspecified amount of time. Instead, the sniffer program is deployed on a host system, removed, and then subsequently re-deployed to another host system of the computer network such that the sniffer roams the computer network as opposed to being fixed to a particular location. In a cloud-based environment, the sniffer program may be deployed as an instance in the cloud environment in which the cloud environment is configured to mirror network traffic from other individual instances to the sniffer program. The sniffer program being described as deployed for a limited-time-period within the context of the cloud environment refers to the notion that the sniffer program has network traffic mirrored from a first instance for a period of time and then the cloud environment is reconfigured to mirror traffic from a second instance to sniffer program. As such, the sniffer program does not have to be instantiated multiple times and does not move throughout the network, rather the cloud environment is reconfigured each time to permit the network traffic of a different portion (e.g., a different instance) of the cloud environment to be routed to the sniffer program.

While deployed, in various embodiments, the sniffer program monitors the network traffic of the area where it has been deployed in order to learn about the characteristics of that traffic. As an example, the sniffer program may sample the network traffic of a host system in order to identify if data of interest (e.g., financial information) is included in that traffic. The sniffer program may send its findings to the control program and then may be redeployed to monitor the network traffic of another portion of the computer network. In this way, the sniffer program can be said to "roam" the computer network, inspecting the network traffic of different portions of the computer network in order to help build a map of the topology of the computer network (e.g., to identify applications and services running on the network and where data of interest is or may be located). In some embodiments, the sniffer program can continue to roam the network to revisit portions of the network that have already been visited, as the landscape of the network can change (e.g., new software instances are instantiated).

The control program may generate a map of the topology of the computer network based on information collected by the sniffer program. Such a map may identify portions of the network that store data of interest to the entity. In various cases, once the topology of a computer network is understood, the amount of network traffic that is really of interest to an entity is much smaller than the entire network traffic of the network. As a result, instead of deploying a system, such as a data collector, to each hypervisor of the network (or for each instance of the cloud network), the entity may deploy the system (e.g., a data collector) to specific portions of the network. Thus, the entity may be able to gain a deeper visibility into their network and ensure that data is properly handled within the network without incurring the high resource cost of deploying a data collector to each hypervisor of the network.

In one example implementation, there are at least four separate systems that together enable the topology of a computer network to be understood and protected. These systems include a traffic sniffer that continually roams the network to discover portions of the network that may be of interest to entity, a data collector that provides real-time monitoring of traffic and enforcement of security policies against that traffic, a control program that deploys the traffic sniffer (and data collector) and generates a map describing the topology of the network, and an orchestrator program that deploys software programs on computer systems in the network. In various cases, multiple sniffer programs and/or data collector programs may be deployed within a computer network. For example, if a computer network has thousands of computer systems, it may not be feasible for a single sniffer program to analyze the network traffic of most or all of those computer systems. As such, multiple sniffer programs may be deployed in order to analyze the network traffic of such a computer network.

In the example implementation, the computer network includes multiple computer systems that are managed by the orchestrator program. A user may initially identify, to the control program, samples or information about data that is deemed of interest by the user. That is, the user may have a preference to know where particular data is located within a computer network and thus may provide an indication of such data to the control program—the user's input can denote the type of data that is deemed of interest to the user. For example, the user may provide a regular expression (or regex) to the control program that can be usable to extract certain information (e.g., social security numbers) from data (e.g., financial data). In some cases, the user may be presented with a set of predefined templates (e.g., a financial template) that have each been designed for identifying specific data within a computer network. As an example, the financial template may include machine learning models that have been trained to identify certain financial information from data objects extracted from network traffic.

Once the user has identified data of interest, the control program may interface with the orchestrator program to perform a series of deployments of the sniffer program onto the computer systems of the computer network. Accordingly, the orchestrator program can deploy the sniffer program on a computer system such that the sniffer program is connected to a network of that computer system and is able to sample data from that network. The sniffer program may sample the network traffic in order to identify (e.g., using regular expressions, machine learning models, etc.) instances of data (e.g., social security numbers) that are of interest to the user. The sniffer program may report discoveries of such data to the control program, including where that data was found. The sniffer program may be repeatedly removed and then redeployed to different computer system in order to provide the control program with information for generating a map identifying portions of the computer network where data of interest is stored. Accordingly, if the landscape of the network changes, the sniffer program may discover new portions of the network where data of interest can be found.

As part of generating the map of the topology of the computer network, the control program may score different portions of the network based on the information that is provided by the sniffer program (and/or data collectors). For example, a network portion that has high volume traffic and data of interest may be scored higher than a network portion with low volume traffic and data of interest. The user may use the map in order to determine where to deploy a set of data collectors for continuous monitoring of network traffic and to ensure that data is properly handled. The data collectors may further provide information to the control program to improve the map such that a user may gain greater visibility into the network.

These techniques may be advantageous as they allow for an entity to identify portions of a computer network where data of interest to the entity is stored. That is, these techniques discuss an approach that helps entities to understand the topology of their network, which includes understanding where data of interest is located, by deploying one or more traffic sniffers that roam around the network and sample network traffic to discover portions of the network that have data of interest. Once such portions are discovered, the entities may deploy only enough data collectors at the right locations so that they can receive real-time continuous monitoring with deep visibility into a specific set of traffic with lower cost and complexity than those other approaches discussed above.

Turning now to FIG. 1, a block diagram of a system 100 is illustrated. System 100 includes a set of components that may be implemented via hardware or a combination of hardware and software routines. In the illustrated embodiment, system 100 includes host systems 110A-C that are part of a computer network 112 (which may alternately be referred to as a target environment), an orchestrator 120, a controller 130, and a sniffer 140. In some embodiments, system 100 may be implemented differently than shown. For example, system 100 may include multiple sniffers 140 that are deployed on different host systems 110.

System 100, in various embodiments, is a computer cluster that can implement a computing platform for providing services and functionality to users of system 100. System 100 may be, for example, a cloud-based platform that provides services and resources from programs and hardware of system 100 to users via the Internet. System 100 may implement a private computing platform that is used exclusively by a single organization or a public computing platform that is accessible by various organizations. In either case, system 100 may store data for various users and operate on that data on behalf of those users or other entities. In order to provide such functionality, system 100 includes host systems 110 capable of implementing the appropriate software programs.

Host systems 110, in various embodiments, are computer systems on a computer network 112 that provide services to users and other computer systems. A host system 110 may implement a hypervisor that allows for one or more virtual machines to be instantiated on the host system 110 for running various software programs. As an example, a host system 110 may implement, through a virtual machine, a database server that manages a database storing data for users associated with system 100. In various cases, the software programs executing on a host system 110 may interact with other components inside system 100 (e.g., software programs executing on other host systems 110) and outside system 100 (e.g., a service that is running on a cloud-based platform). In various embodiments, orchestrator 120 manages the deployment of software programs on a host system 110.

Orchestrator 120, in various embodiments, is a set of software routines that are executable to automate deployment, scaling, and management of software programs running on host systems 110. Amazon Web Services™ and Kubernetes™ are examples of orchestrator 120. Accordingly, in the Amazon Web Services™ context, orchestrator 120 may provide a mechanism for deploying instances (or workloads) onto host systems 110 that implement a cloud-based environment. In the Kubernetes™ context, orchestrator 120 may provide container-centric management environment for deploying and managing application containers, which can be portable, self-sufficient units having an application and its dependencies. As a result, orchestrator 120 may be used to instantiate software programs, such as sniffer 140, on host systems 110. In various embodiments, orchestrator 120 stores cluster information that describes the resources and configuration of the environment that is managed by orchestrator 120. The cluster information may describe, for example, what host systems 110 make up computer network 112, their computer resources (e.g., computer nodes and storage volumes), what software programs are running on those host systems, and the internal networks of each of those host system. Orchestrator 120 may use that cluster information to deploy software applications on host systems 110. As explained below, orchestrator 120 can be used by controller 130 to deploy sniffers 140 on host systems 110.

Controller 130, in various embodiments, is a set of software routines that are executable to facilitate the discovery of locations on computer network 112 that include instances of data deemed interesting by a user of system 100. Consider an example in which host systems 110 are operated on behalf of a financial institution that stores financial data for millions of users. Such financial data may include social security numbers, account balances, credit history, and other data that the financial institution deems of interest and wishes to ensure is properly handled. In various cases, the financial data may be stored as unstructured data across computer network 112 such that the locations where the data is stored are not readily apparent to the financial institution. As such, controller 130 may facilitate the discovery of where such financial data is stored and how it is used. To facilitate such discovery, in various embodiments, controller 130 performs limited-time-period deployments of sniffer program 140.

Sniffer 140, in various embodiments, is a set of software routines executable to sample and analyze network traffic 115 for instances of data deemed of interest or may be of interest to a user of system 100. In order to sample network traffic, sniffer 140 may be deployed on a virtual machine of a host system 110 and connected to the network of that host system 110. Thereafter, sniffer 140 may extract data objects from network traffic 115 and/or behavior features of network traffic 115 in order to learn characteristics pertaining to that network traffic. As mentioned, a user may provide information that is usable for identifying data that is of interest to the user. For example, the user may provide a set of SQL commands or a set of regular expressions. In some embodiments, a set of machine learning models may be trained based on data samples of data of interest. In various embodiments, sniffer 140 analyzes extracted data objects for instances of data that is identified as interesting by the user. For example, sniffer 140 may determine if the data objects are associated with the provided set of SQL commands, contain data that can be extracted from content of those data objects through the regular expressions, or contain data that is flagged by the machine learning models.

In various embodiments, sniffer 140 provides controller 130 with network information 145 that identifies locations (e.g., host system 110) of computer network 112 where data of interest was observed by sniffer 140. Network information 145 may also identify behavior features of the network within a host system 110. As an example, network information 145 may identify who is sending and receiving data on the network (e.g., what software programs, users, etc.), what is being sent or received, and at what time the data is being sent or received. In some embodiments, network information 145 is used by controller 130 to identify locations of computer network 112 that may be of interest to the user that is not based on knowledge provided by the user.

To facilitate a discovery of locations on computer network 112 where data of interest exists, in various embodiments, controller 130 performs limited-time-period deployments of sniffer 140 onto locations within computer network 112. As explained in greater detail with respect to FIG. 3, controller 130 may obtain information from orchestrator 120 that describes a topology of computer network 112—such information may indicate what host systems 110 make up computer network 112. Based on the information, controller 130 issues deployment requests 135 to orchestrator 120 that facilitate the deployment of sniffer 140. For example, deployment request 135 may identify a host system 110 (e.g., host system 110B) on which to deploy sniffer 140. Accordingly, orchestrator 120 issues a deployment instruction 125 to the appropriate host system 110 to deploy sniffer 140 on that host system. Deployment instruction 125, in various embodiments, instructs an agent that is executing on that host system 110 (e.g., the agent may be the Docker™ program) to instantiate sniffer 140. At a later point in time, controller 130 may instruct orchestrator 120 to remove sniffer 140 from a host system 110 and redeploy sniffer 140 onto another host system 110. By removing and redeploying sniffer 140, sniffer 140 may analyze the network traffic of the host systems 110 of computer network 112 in order to assist controller 130 in building a map that identifies locations on computer network 112 where data of interest is observed.

Figure 2:
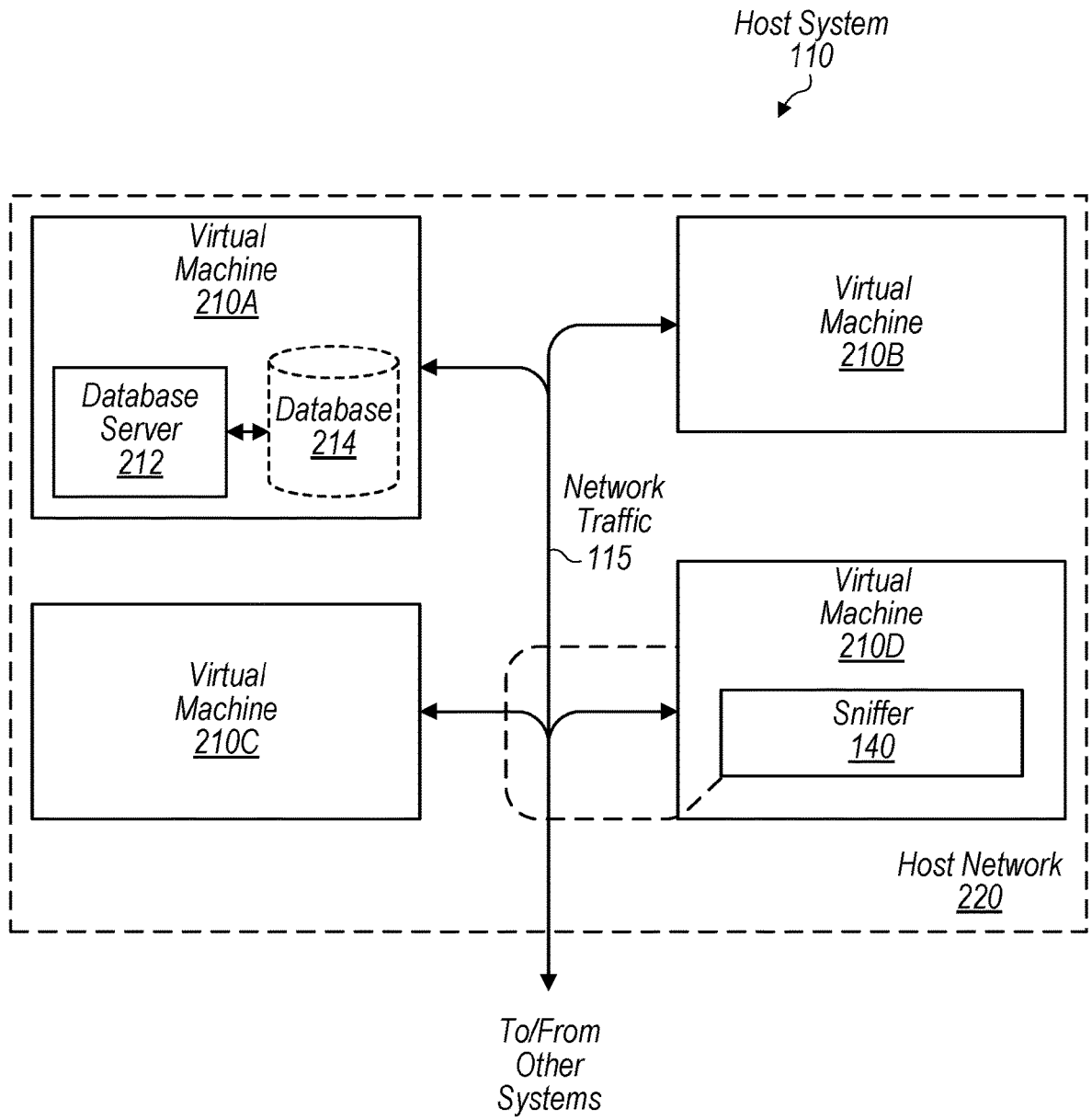
FIG. 2 is a block diagram illustrating example elements of a host system, according to some embodiments.

Turning now to FIG. 2, a block diagram of an example host system 110 is illustrated. In the illustrated embodiment, host system 100 includes virtual machines 210A-D that are part of a host network 220. Also as shown, virtual machine 210A implements a database server 212 that interacts with a database 214 (which might be located on a network attached storage), and virtual machine 110D implements sniffer 140. Host system 110 may be implemented differently than shown. For example, host system 100 may include multiple host networks 220, a different number of virtual machines 210, and/or different software programs.

Virtual machines 210, in various embodiments, are software routines executable to provide an environment in which other software programs (e.g., sniffer 140) can execute. In various cases, the software programs executing on virtual machines 210 may manage data on behalf of an entity associated with system 100. As illustrated for example, database server 212 interacts with database 214; such interaction may involve providing database services such as data storage, data retrieval, and data manipulation. These database services may be provided by database server 212 to other components (e.g., software programs running on the same virtual machine 210, software programs running on other virtual machines 210, and entities outside of computer network 112). As part of providing such database services, database server 212 may transmit data objects as network traffic 115 to the other components.

As shown, virtual machines 210 are connected to host network 220. Host network 220, in various embodiments, is a virtual network on which virtual machines 210A-D are connected to a virtual switch through which their network traffic 115 flows. When sniffer 140 is deployed on host system 110, sniffer 140 may be connected to that virtual switch in such a way that network traffic 115 from virtual machines 210A-C is routed through sniffer 140. Consequently, sniffer 140 may analyze network traffic 115 to extract data objects and behavioral features from that network traffic 115. For example, database server 212 may receive a request specifying an SQL command to be executed against database 214. As a result, database server 212 may return data from database 214 back to the requestor. On its way back, sniffer 140 may extract that data from network traffic 115 and use a regular expression to attempt to extract a particular instance of data from that data. For example, sniffer 140 may attempt to extract a social security number from the data using a regular expression designed to extract social security numbers.

In cases where network traffic 115 is encrypted, sniffer 140 may analyze SSL fingerprints associated with network traffic 115 to identify abnormal traffic. If network traffic 115 is associated with SSL fingerprints that are not identified on a list provided to sniffer 140, then sniffer 140 may identify the locations associated with such traffic to controller 130. Accordingly, controller 130 may present the locations to a user so that the user can make an informed decision on whether to deploy data collectors (discussed in greater detail with respect to FIG. 4) to those locations. In some embodiments, a data collector can be set up as a secure sockets layer (SSL) proxy that sits between the origin and the destination. As such, when network traffic 115 pass through the proxy, the data collector may decrypt that network traffic 115 in order to inspect its contents for instances of data of interest. After inspecting the network traffic 115, the data collector may re-encrypt that network traffic 115 and transmit it to the destination.

As mentioned, sniffer 140 may identify behavioral features associated with network traffic 115. These behavioral features may include what entities are communicating, what data is being communicated, how often that data is being communicated, etc. This information may be used to identify portions of computer network 112 that a user may want to deploy, for example, a security system. For example, sniffer 140 may notice that database server 212 services a high number of requests for data in database 214 and, as a result, there is high volume of network traffic 115 that originates from database server 212. Sniffer 140 may note this behavioral feature associated with virtual machine 210A and report it back to controller 130. While no data of interest to a user may be observed within network traffic 115 of host system 110, it might still be desirable to deploy, for example, a security system on host system 110 due to the high volume of traffic the flows between virtual machine 210A and other components. That is, host system 110 be identified as a location of interest because it experiences a high volume of traffic, which may indicate its importance. As such, sniffer 140 may collect this behavioral information and provide it to controller 130 so that such locations may be suggested to the user as locations of interest. That is, sniffer 140 may not only identify instances of data of interest but also may identify locations that may be of interest to the user, even in cases when network traffic from those locations has not included data of interest.

In some embodiments, a cloud-based environment may be implemented instead of a virtual machine-based environment. In a cloud-based environment, sniffer 140 may not be deployed such that sniffer 140 "roams" computer network 112. Instead, in various embodiments, network traffic mirroring features of orchestrator 120 may be used to route network traffic from specific instances or workloads to sniffer 140. That is, sniffer 140 may be connected to a network port through which orchestrator 120 redirects network traffic so that sniffer 140 can sample that traffic. In some cases, sniffer 140 samples network traffic 115 of a particular instance for a specified period of time and then orchestrator 120 reconfigures the environment to route network traffic 115 of another instance of the cloud environment. In some embodiments, the user may identify a certain type of instance and orchestrator 120 may route network traffic 115 from instances of only that type. As a result, the user may selectively control what network traffic 115 is mirrored to sniffer 140. As mentioned, in some embodiments, multiple sniffers 140 may be deployed that sniff network traffic 115 from different portions of computer network 112.

Figure 3:
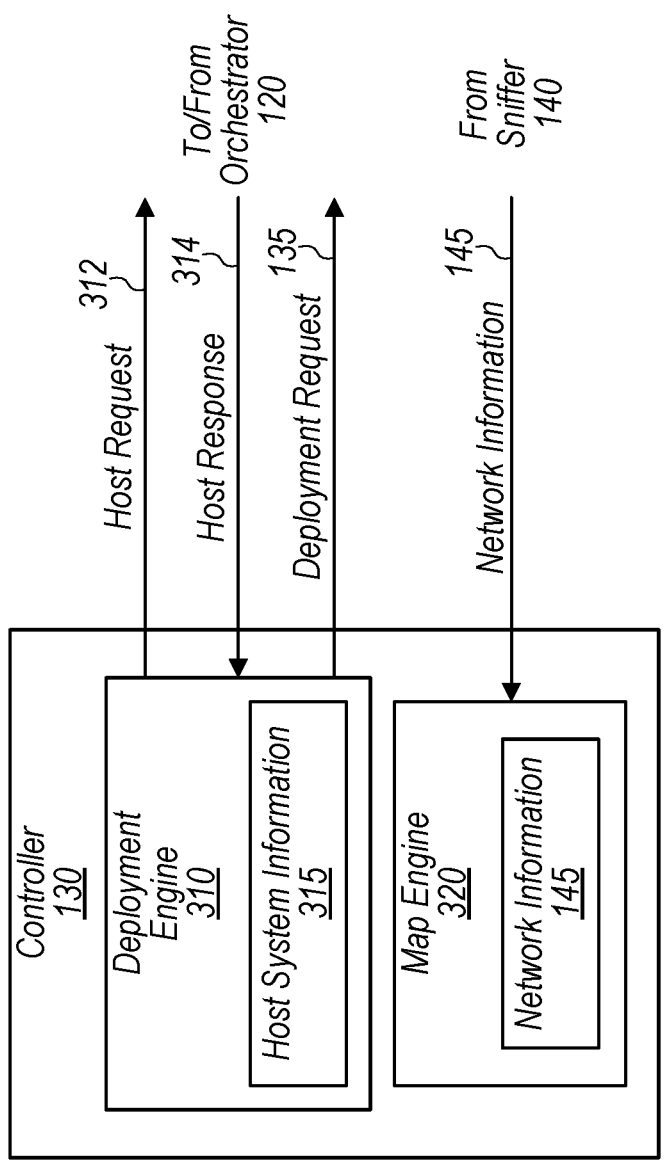
FIG. 3 is a block diagram illustrating example elements of a controller that facilitates data discovery on a computer network via a sniffer, according to some embodiments.

Turning now to FIG. 3, a block diagram of a controller 130 is illustrated. In the illustrated embodiment, controller 130 includes a deployment engine 310 and a map engine 320. As further shown, deployment engine 310 includes host system information 315 and map engine 320 includes network information 145. In some embodiments, controller 130 may be implemented differently than shown. For example, controller 130 may include an interface component for presenting data to users.

Deployment engine 310, in various embodiments, is a set of software routines executable to facilitate the deployment of sniffer 140. To facilitate the deployment of sniffer 140, deployment engine 310 issues host request 312 to orchestrator 120. Host request 312, in various embodiments, is a request for information about the topography of computer network 112. As shown, orchestrator 120 can provide back a host response 314, which may include host system information 315. Host system information 315, in various embodiments, describes the topography of computer network 112. Such a description may disclose how many host systems 110 are on computer network 112, how many host networks 220 are on each host system 110, how many virtual machines 210 are executing on each host system 110 (or host network 220), and what software programs are running on each virtual machine 210. For a cloud-based environment implementation, the description may disclose other or additional information such as how many instances or workloads are running and what the different types of software programs are executing in the cloud environment.

In some embodiments, deployment engine 310 periodically issues host request 312 in order to learn of any changes to computer network 112. It may be desirable for deployment engine 310 to learn about new instantiations of virtual machines 210 so that it may deploy sniffer 140 to check network traffic 115 from those virtual machines 210 for data of interest. For example, orchestrator 120 may deploy a new database server 212 on a new virtual machine 210 running on a particular host system 110. By periodically issuing host request 312, deployment engine 310 may learn about the new database server 212 and deploy sniffer 140 to inspect network traffic 115 from that server 212.

Various deployment schemes may be used by deployment engine 310 for deploying sniffer 140 onto host systems 110 throughout computer network 112. In some embodiments, deployment engine 310 may implement a round robin scheme in which deployment engine 310 rotates through the host systems 110 identified by host system information 315, deploying sniffer 140 on each host system 110 for a limited period of time. In some embodiments, deployment engine 310 presents a list of host systems 110 to a user and allows that user to identify which host systems 110 to deploy sniffer 140 onto and the order of deployment. The user may specify the amount of system resources and time that sniffer 140 can expend running on a particular host system 110. In some embodiment, deployment engine 310 selects host systems 110 based on current resource usage of those systems 110. For example, deployment engine 310 may skip a host system 110 if it is currently busy (e.g., it has a high CPU usage) and choose a less busy host system 110. Deployment engine 310 might return to the former host system 110 when it is less busy and has systems resources to support the deployment of sniffer 140. As mentioned, how long sniffer 140 can remain on a host system 110 may be specified by a user; sniffer 140 may also remain on a host system 110 until it has observed a certain amount of network traffic 115.

Based on host system information 315 and user preferences, deployment engine 310 may send deployment request 135 to orchestrator 120 to deploy sniffer 140 on a host system 110. After a specified amount of time has elapsed, deployment engine 310 may send deployment request 135 to orchestrator 120 to remove sniffer 140 from that host system 110 and, if appropriate, redeploy sniffer 140 onto another host system 110. Deployment engine 310 may continue to deploy sniffer 140 after all host systems 110 have been visited—that is, deployment engine 310 may implement multiple rounds of deployments. In some embodiments, deployment engine 310 may deploy more than one sniffer 140. For example, if computer network 112 is reasonably large (e.g., has thousands of host systems 110) such that one sniffer 140 would take an unreasonable amount of time to scan the entire computer network 112, then deployment engine 310 may deploy multiple sniffers 140 to more quickly cover computer network 112. In some cases, where deployment is repeatable, how often it is repeatable, and how many sniffers 140 can be deployed may be defined a user associated with system 100. In some cases, a host system 110 may include multiple host networks 220. As a result, deployment engine 310 may perform multiple deployments of sniffer 140 to a host system 110, where each deployment connects sniffer 140 to a different host network 220 of the host system 110.

Map engine 320, in various embodiments, is a set of software routines that are executable to generate a map indicating portions of computer network 112 where a user might wish to deploy a data collector or a security system, for example. To generate the map, map engine 320 may use network information 145 received from sniffer 140 as sniffer 140 is deployed to different portions of computer network 112. As mentioned, network information 145 may indicate where (e.g., what host system 110) data of interest to a user has been observed in network traffic 115 and may indicate behavioral features associated with the network traffic 115 of different host systems 110. Accordingly, map engine 320 may generate a map based on network information 145 such that the map indicates locations of interest to the user.

In some embodiments, map engine 320 may score different portions of computer network 112 based on network information 145. For example, if the network traffic 115 of a particular host system 110 has included instances of different types of data of interest (e.g., bank account numbers, social security numbers, driver license numbers—examples of three different types), then that host system 110 may be scored higher than a host system 110 whose network traffic 115 included only instances of one type of data of interest. The behavioral features may also affect the score. A host system 110 that experiences a high amount of network traffic 115 might be scored higher than a host system 110 that experiences a low amount of network traffic 115. As another example, a host system 110 that runs database servers may be scored higher than a host system 110 that runs only application servers. In various embodiments, map engine 320 presents these scores to the user for different portions of computer network 112 so that the user may prioritize particular portions of computer network 112 over others for deploying more permanent sniffers, for example.

Figure 4:
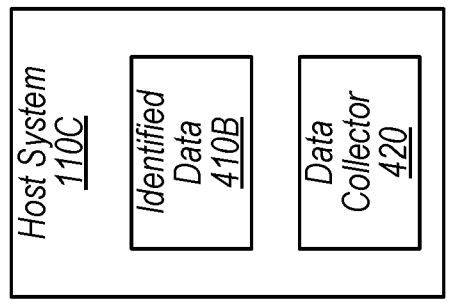
FIG. 4 is a block diagram illustrating an example of deploying a set of data collectors to a set of host systems having identified data, according to some embodiments.
Figure 4:
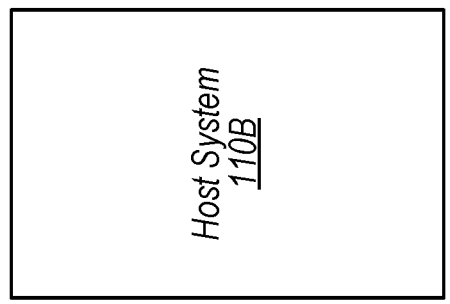
Figure 4:
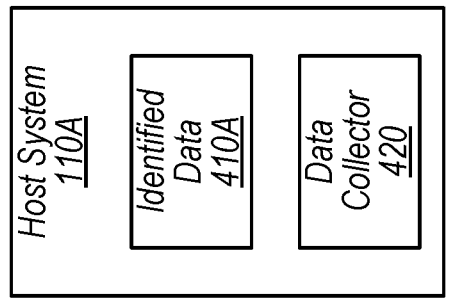

Turning now to FIG. 4, a block diagram of an example set of three host systems 110A-C is illustrated. In the illustrated embodiment, host systems 110A and 110C include identified data 410 and a data collector 420. In some embodiments, the illustrated embodiment may be implemented differently than shown. For example, there may be more or less host systems 110, one or more of which may include identified data 410 and a data collector 420.

Identified data 410, in various embodiments, is data identified by sniffer 140 as potentially being of interest to the user. As shown, host systems 110A and 110C include identified data 410A and 410B. As an example, host system 110A's identified data 410A may include social security numbers while host system 110C's identified data 410B may include bank account numbers. Since identified data 410 has been discovered on host systems 110A and 110C and not host system 110B, then a user may wish to deploy a data collector to both host systems 110A and 110C.

Data collector 420, in various embodiments, is a set of software routines that are executable to monitor network traffic 115 and enforce security policies on that traffic in some cases. In some embodiments, data collector 420 is the same as sniffer 140 except for data collector 420 is not time limited as sniffer 140. That is, while sniffer 140 may roam computer network 112, executing for a specified amount of time on each host system 110, data collector 420 may be fixed to a location on computer network 112 where it will execute from an unspecified amount of time. Data collector 420 may continue to analyze network traffic 115 and report network information 145 to controller 130 for improving the map generated by map engine 320. That is, because sniffer 140 monitors the network traffic 115 of a given location for a limited amount of time, the network information 145 provided by sniffer 140 may not provide a full picture of the network traffic that occurs at that given location. Accordingly, data controller 420 may continue to monitor network traffic 115 to provide a fuller picture of the network traffic 115 at a location.

Figure 5:
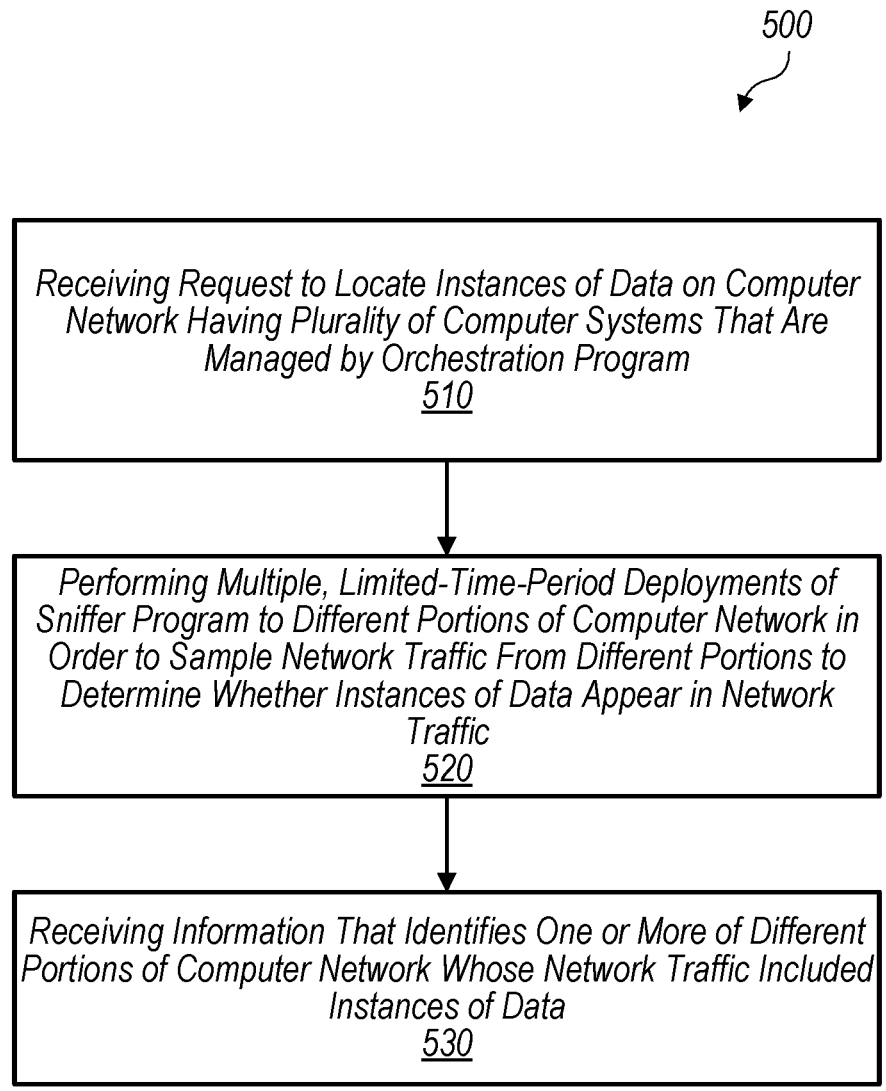
FIGS. 5 and 6 are flow diagrams illustrating example methods relating to deploying a sniffer program to different portions of a computer network, according to some embodiments.

Turning now to FIG. 5, a flow diagram of a method 500 is shown. Method 500 is one embodiment of a method performed by a control program (e.g., a controller 130) that is executing on a computer system (e.g., a system 100) to locate instances of data (e.g., identified data 410) on a computer network (e.g., a computer network 112). Method 500 may be performed by executing a set of program instructions stored on a non-transitory computer-readable medium. In some cases, method 500 may include more or less steps than shown. For example, method 500 may include a step in which the control program is instantiated on the computer system.

Method 500 begins in step 510 with the control program receiving a request to locate instances of data on the computer network that includes a plurality of computer systems (e.g., host systems 110) that are managed by an orchestration program (e.g., an orchestrator 120). The request to locate instances of the data may include a regular expression that defines a search pattern and/or an SQL command.

In step 520, the control program performs multiple, limited-time-period deployments of a sniffer program (e.g., a sniffer 140) to different portions (e.g., different host systems 110) of the computer network in order to sample network traffic (e.g., network traffic 114) from the different portions to determine whether instances of the data appear in the network traffic. In various cases, sampling the network traffic may include extracting a set of data objects from the network traffic and applying the regular expression to content of the set of data objects to determine whether the content includes instances of the data. In some cases, sampling the network traffic may also include determining whether content of the network traffic is associated with the SQL command.

In various embodiments, the control program mat perform a particular one of the multiple, limited-time-period deployments by selecting one of the plurality of computer systems on which to deploy the sniffer program. The control program may than instruct the orchestration program (e.g., via a deployment request 135) to deploy the sniffer program on the selected computer system such that the sniffer program is connected to a network (e.g., a host network 220) of the selected computer system and is capable of sampling network traffic of the network. The control program may cause the sniffer program to be removed from the selected computer system before performing a subsequent deployment of the sniffer program on a different portion of the computer network. In some instances, removing the sniffer program from the selected computer system is performed in response to the control program determining that the sniffer program has executed on the selected computer system for an interval of time (e.g., one day) that satisfies a threshold specified by a user associated with the computer network.

In some embodiments, the control program causes a user interface to be presented to the user that identifies the plurality of computer systems. The control program may receive, from the user, a selection of a subset of the plurality of computer systems (e.g., the user may select a portion of their network to scan instead of all of it). Consequently, the selected computer system for the particular deployment may be selected from the subset of computer systems. The control program may also receive, from the user, user input that identifies an amount of computer resources (e.g., 10% of CPU) that the sniffer program is permitted to consume when executing on a given computer system. Consequently, the selecting may be based on the available computer resources of each of the plurality of computer systems. The control program may periodically communicate with the orchestration program (e.g., via host requests 312 and responses 314) to identify a list of programs that are executing on the plurality of computer systems. The selecting may be based on the list of programs. Subsequent to the particular deployment, the control program may determine, based on the periodically communicating, that the list of programs identifies a program that was initiated on the selected computer system after the particular deployment. Accordingly, a second particular one of the multiple, limited-time-period deployments may involve redeploying the sniffer program on the selected computer system.

In step 530, the control program receives, from the sniffer program, information (e.g., network information 145) that identifies one or more of the different portions of the computer network whose network traffic included instances of the data. In various embodiments, the control program generates a map identifying particular portions of the computer network whose network traffic included instances of the data. The control program may then cause the map to be presented to the user and receive, from the user, a selection of one or more of the particular portions identified by the map. After, the control program may perform one or more deployments of a data collector program (e.g., a data collector 420) to the selected one or more particular portions, which may be operable to sample network traffic and enforce a set of policies on the sampled network traffic. In some cases, the information that is received from the sniffer program identifies a set of behavioral features that describe the different portions of the computer network. The map may be generated based on the set of behavior features, where the map specifies scores for the different portions of the computer network. In some cases, a first portion of the computer network may be scored higher than a second portion of the computer network based on the set of behavioral features. The set of behavioral features may identify a specific portion of the computer network that is associated with a threshold amount of network traffic. The set of behavioral features may identify a specific portion of the computer network that is associated with accesses that originate from a threshold number of different entities.

Figure 6:
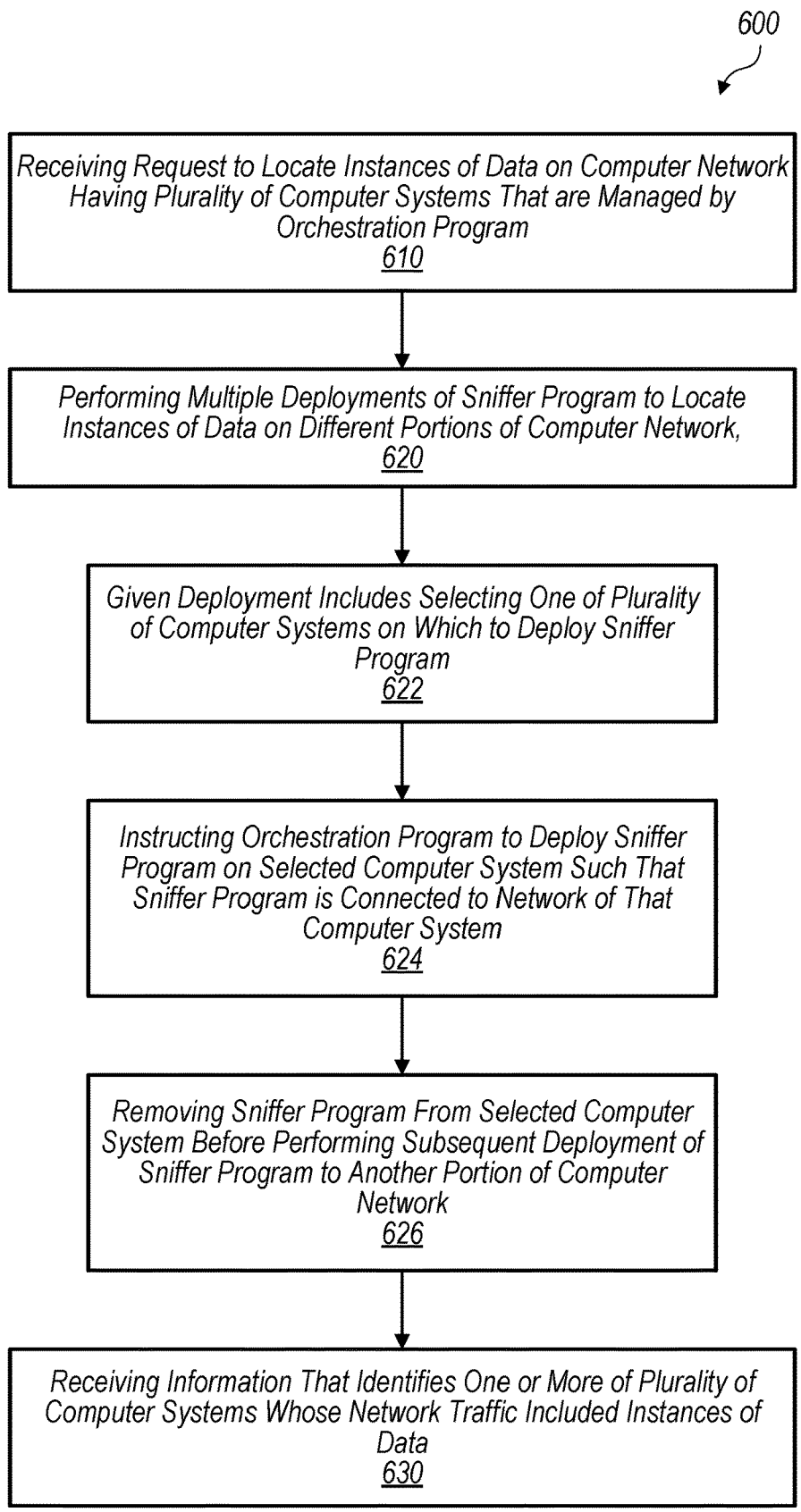

Turning now to FIG. 6, a flow diagram of a method 600 is shown. Method 600 is one embodiment of a method performed by a control program (e.g., a controller 130) that is executing on a computer system (e.g., a system 100) to locate instances of data (e.g., identified data 410) on a computer network (e.g., a computer network 112). Method 600 may be performed by executing a set of program instructions stored on a non-transitory computer-readable medium. In some cases, method 600 may include more or less steps than shown. For example, method 600 may include a step in which the control program is instantiated on the computer system.

Method 600 begins in step 610 with the control program receiving a request to locate instances of data on the computer network that includes a plurality of computer systems (e.g., host systems 110) that are managed by an orchestration program (e.g., an orchestrator 120). The request to locate instances of the data may include a regular expression that defines a search pattern.

In step 620, the control program performs multiple deployments of a sniffer program (e.g., a sniffer 140) to locate instances of the data on different portions of the computer network. A given deployment includes, in step 622, selecting one of the plurality of computer systems on which to deploy the sniffer program and, in step 624, instructing the orchestration program to deploy the sniffer program on the selected computer system such that the sniffer program is connected to a network (e.g., a host network 220) of that computer system. The sniffer program may be capable of sampling network traffic (e.g., network traffic 114) of the network of that computer system to determine whether instances of the data appear on the network. In some embodiments, sampling the network traffic includes extracting a set of data objects from the network traffic and applying the regular expression to content of the set of data objects to determine whether the content includes instances of the data. The given deployment also include, in step 626, removing the sniffer program from the selected computer system before performing a subsequent deployment of the sniffer program to another portion of the computer network.

In step 630, the control program receives, from the sniffer program, information (e.g., network information 145) that identifies one or more of the plurality of computer systems whose network traffic included instances of the data. In various embodiments, the control program generates a map that identifies particular portions of the computer network whose network traffic included instances of the data and causes the map to be presented to a user that is associated with the computer network. The control program may then receive, from the user, a selection of one or more of the particular portions identified by the map. The control program may perform one or more deployments of a data collector program (e.g., a data collector 420) to the selected one or more particular portions. In various embodiments, the data collector program is operable to sample network traffic and enforce a set of data control policies on sampled network traffic.

Exemplary Computer System

Figure 7:
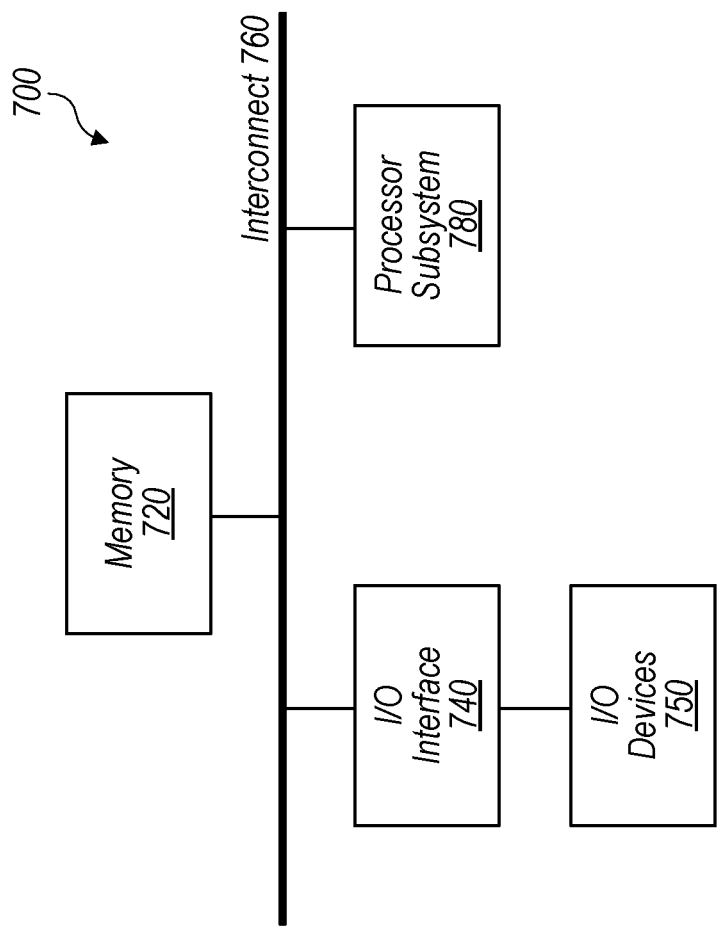
FIG. 7 is a block diagram illustrating an example computer system capable of implementing various systems described in the present disclosure, according to some embodiments.

Turning now to FIG. 7, a block diagram of an exemplary computer system 700, which may implement a host system 110, orchestrator 120, controller 130, and/or sniffer 140, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement orchestrator 120, controller 130, and sniffer 140 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U. S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
receiving, by a control program that is executing on a computer system, a request to locate instances of data on a computer network having a plurality of computer systems that are managed by an orchestration program;
performing, by the control program, multiple, limited-time-period deployments of a sniffer program to different portions of the computer network in order to sample network traffic from the different portions to determine whether instances of the data appear in the network traffic, wherein performing a particular one of the multiple, limited-time-period deployments includes:
selecting one of the plurality of computer systems on which to deploy the sniffer program;
instructing the orchestration program to deploy the sniffer program on the selected computer system such that the sniffer program is connected to a network of that computer system, wherein the sniffer program is capable of sampling network traffic of the network of that computer system to determine whether instances of the data appear on that network; and
removing the sniffer program from the selected computer system before performing a subsequent deployment of the sniffer program to another portion of the computer network; and
receiving, by the control program from the sniffer program, information that identifies one or more of the different portions of the computer network whose network traffic included instances of the data.

2. The method of claim 1, wherein the removing of the sniffer program from the selected computer system is performed in response to determining that the sniffer program has executed on the selected computer system for an interval of time that satisfies a threshold specified by a user associated with the computer network.

3. The method of claim 1, further comprising:
causing, by the control program, a user interface to be presented to a user associated with the computer network, wherein the user interface identifies the plurality of computer systems; and
receiving, by the control program from the user, a selection of a subset of the plurality of computer systems, wherein the selected computer system is selected by the control program from the subset of computer systems.

4. The method of claim 1, further comprising:
receiving, by the control program from a user associated with the computer network, user input identifying an amount of computer resources that the sniffer program is permitted to consume when executing on a given computer system, wherein the selecting is based on available computer resources of each of the plurality of computer systems.

5. The method of claim 1, further comprising:
periodically communicating, by the control program, with the orchestration program to identify a list of programs that are executing on the plurality of computer systems, wherein the selecting is based on the list of programs.

6. The method of claim 5, further comprising:
subsequent to the particular deployment, the control program determining, based on the periodically communicating, that the list of programs identifies a program that was initiated on the selected computer system after the particular deployment, and
wherein a second particular one of the multiple, limited-time-period deployments involves redeploying the sniffer program on the selected computer system.

7. The method of claim 1, wherein the request to locate instances of the data includes a regular expression that defines a search pattern, and wherein sampling the network traffic includes:
extracting a set of data objects from the network traffic; and
applying the regular expression to content of the set of data objects to determine whether the content includes instances of the data.

8. The method of claim 1, wherein the request to locate instances of the data includes an SQL command, and wherein sampling the network traffic includes determining whether content of the network traffic is associated with the SQL command.

9. A non-transitory computer readable medium having program instructions stored thereon that are executable by a computer system to cause the computer system to perform operations comprising:
receiving a request to locate instances of data on a computer network having a plurality of computer systems that are managed by an orchestration program;
performing multiple, limited-time-period deployments of a sniffer program to different portions of the computer network in order to sample network traffic from the different portions to determine whether instances of the data appear in the network traffic, wherein performing a particular one of the multiple, limited-time-period deployments includes:
selecting one of the plurality of computer systems on which to deploy the sniffer program;
instructing the orchestration program to deploy the sniffer program on the selected computer system such that the sniffer program is connected to a network of that computer system, wherein the sniffer program is capable of sampling network traffic of the network of that computer system to determine whether instances of the data appear on that network; and
removing the sniffer program from the selected computer system before performing a subsequent deployment of the sniffer program to another portion of the computer network; and
receiving, from the sniffer program, information that identifies one or more of the different portions of the computer network whose network traffic included instances of the data.

10. The medium of claim 9, further comprising:
generating a map that identifies particular portions of the computer network whose network traffic included instances of the data; and
causing the map to be presented to a user that is associated with the computer network.

11. The medium of claim 10, further comprising:
receiving, from the user, a selection of one or more of the particular portions identified by the map; and
performing one or more deployments of a data collector program to the selected one or more particular portions, wherein the data collector program is operable to sample network traffic and enforce a set of policies on sampled network traffic.

12. The medium of claim 10, wherein the information that is received from the sniffer program identifies a set of behavioral features that describe the different portions of the computer network, wherein the map is generated based on the set of behavior features.

13. The medium of claim 12, wherein the map specifies scores for the different portions of the computer network, wherein a first portion of the computer network is scored higher than a second portion of the computer network based on the set of behavioral features.

14. The medium of claim 12, wherein the set of behavioral features identifies a specific portion of the computer network that is associated with a threshold amount of network traffic.

15. The medium of claim 12, wherein the set of behavioral features identifies a specific portion of the computer network that is associated with accesses that originate from a threshold number of different entities.

16. A system, comprising:
at least one processor; and
memory having program instructions stored thereon that are executable by the at least one processor to cause the system to perform operations comprising:
receiving a request to locate instances of data on a computer network having a plurality of computer systems that are managed by an orchestration program;
performing multiple deployments of a sniffer program to locate instances of the data on different portions of the computer network, wherein a given deployment includes:
selecting one of the plurality of computer systems on which to deploy the sniffer program;
instructing the orchestration program to deploy the sniffer program on the selected computer system such that the sniffer program is connected to a network of that computer system, wherein the sniffer program is capable of sampling network traffic of the network of that computer system to determine whether instances of the data appear on the network; and
removing the sniffer program from the selected computer system before performing a subsequent deployment of the sniffer program to another portion of the computer network; and
receiving, from the sniffer program, information that identifies one or more of the plurality of computer systems whose network traffic included instances of the data.

17. The system of claim 16, further comprising:
generating a map that identifies particular portions of the computer network whose network traffic included instances of the data; and
causing the map to be presented to a user that is associated with the computer network.

18. The system of claim 17, further comprising:
receiving, from the user, a selection of one or more of the particular portions identified by the map; and
performing one or more deployments of a data collector program to the selected one or more particular portions, wherein the data collector program is operable to sample network traffic and enforce a set of data control policies on sampled network traffic.

19. The system of claim 16, wherein the request to locate instances of the data includes a regular expression that defines a search pattern, and wherein sampling the network traffic includes:
extracting a set of data objects from the network traffic; and
applying the regular expression to content of the set of data objects to determine whether the content includes instances of the data.

* * * * *